US009030949B2

(12) United States Patent
Han et al.

(10) Patent No.: US 9,030,949 B2
(45) Date of Patent: May 12, 2015

(54) DOWNLINK PMI COORDINATION BASED ON BASE STATION ANTENNA CONFIGURATION

(75) Inventors: Shuangfeng Han, Suwon-si (KR); Zhen Wang, Suwon-si (KR); Eunyong Kim, Suwon-si (KR); Clerckx Bruno, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 753 days.

(21) Appl. No.: 12/578,353

(22) Filed: Oct. 13, 2009

(65) Prior Publication Data

US 2011/0019613 A1    Jan. 27, 2011

Related U.S. Application Data

(60) Provisional application No. 61/228,886, filed on Jul. 27, 2009, provisional application No. 61/230,857, filed on Aug. 3, 2009.

(51) Int. Cl.
*H04L 12/26*  (2006.01)
*H04B 7/06*   (2006.01)
*H04B 7/04*   (2006.01)
*H04L 25/03*  (2006.01)

(52) U.S. Cl.
CPC ............ *H04B 7/0639* (2013.01); *H04B 7/0478* (2013.01); *H04L 2025/03426* (2013.01)

(58) Field of Classification Search
None
See application file for complete search history.

(56) References Cited

U.S. PATENT DOCUMENTS

2009/0059844 A1    3/2009  Ko et al.
2009/0181708 A1*   7/2009  Kim et al. ............. 455/501
2010/0208610 A1*   8/2010  Ihm et al. .............. 370/252

FOREIGN PATENT DOCUMENTS

CN       101330479 A    12/2008
KR    10-2008-0086348 A   9/2008
KR    10-2009-0077185 A   7/2009

* cited by examiner

*Primary Examiner* — Jackie Zuniga Abad
(74) *Attorney, Agent, or Firm* — Jefferson IP Law, LLP

(57) ABSTRACT

A Mobile Station (MS) apparatus and a Base Station (BS) apparatus, and methods for their operation in a wireless communication system, are provided. The method for operating the MS includes receiving Precoding Matrix Index (PMI) subset information from a BS, determining downlink channel quality of the BS, determining a PMI for the BS based on the PMI subset information and the determined downlink channel quality of the BS, and transmitting the determined PMI to the BS.

22 Claims, 14 Drawing Sheets

US 9,030,949 B2

DOWNLINK PMI COORDINATION BASED ON BASE STATION ANTENNA CONFIGURATION

CROSS-REFERENCE TO RELATED APPLICATIONS

This application claims the benefit under 35 U.S.C. §119(e) of a U.S. Provisional application filed on Jul. 27, 2009 in the U.S. Patent and Trademark Office and assigned Ser. No. 61/228,886, and of a U.S. Provisional application filed on Aug. 3, 2009 in the U.S. Patent and Trademark Office and assigned Ser. No. 61/230,857, the entire disclosures of both of which are hereby incorporated by reference.

BACKGROUND OF THE INVENTION

1. Field of the Invention

The present invention relates to a wireless communication system. More particularly, the present invention relates to an apparatus and method for inter-cell interference mitigation in a wireless communication system.

2. Description of the Related Art

Research is being conducted to develop a next generation communication system, also referred to as a $4^{th}$ Generation (4G) communication system or an International Mobile Telecommunications-Advanced (IMT-Advanced) communication system. Representative examples of such a next generation communication system include a communication system based on an Institute of Electrical and Electronics Engineers (IEEE) 802.16m standard (referred to as an IEEE 802.16m system) and a communication system based on a $3^{rd}$ Generation Partnership Project (3GPP) Long Term Evolution (LTE) Advanced standard (referred to as an LTE Advanced system), both of which are under development. The IEEE 802.16m and the LTE Advanced systems both employ an Orthogonal Frequency Division Multiplexing (OFDM)/Orthogonal Frequency Division Multiple Access (OFDMA) scheme so that a broadband network can be supported in a physical channel.

In a wireless communication system employing the OFDM/OFDMA scheme, orthogonal radio resources are allocated by a Base Station (BS) to one or more Mobile Stations (MSs) within a cell coverage area of the BS. Therefore, interference between the MSs within the BS's cell coverage area is not significant. However, if the same radio resource is used in a neighboring cell, an MS located at or adjacent to an edge of the BS's cell may experience interference. Such interference is referred to as inter-cell inference.

FIG. 1 is a schematic diagram for explaining the generation of inter-cell inference in a conventional wireless communication system.

Referring to FIG. 1, an MS 130 receives downlink data by decoding a signal received using a radio resource allocated by a serving BS 110. In this case, if the radio resource allocated by the serving BS 110 to the MS 130 is identical to a radio resource used by an interfering BS 120, the MS 130 receives both a downlink signal transmitted by the BS 110 and a downlink signal transmitted by the BS 120. Accordingly, the MS 130 performs decoding on a mixed signal of the two downlink signals and thus data reception may not be properly achieved. That is, the downlink signal transmitted by the BS 120 acts as interference to the MS 130.

As described above, in a wireless communication system using the OFDM/OFDMA scheme such as the IEEE 802.16m or the LTE Advanced systems, inter-cell interference results in system performance deterioration due to DownLink (DL) or UpLink (UL) signals transmitted from different cells that are using the same frequency resource or time resource.

In addition to the OFDM/OFDMA scheme, the IEEE 802.16m and the LTE Advanced systems both employ a Multiple-Input Multiple-Output (MIMO) scheme. In comparison with a wireless communication system using a single antenna, a wireless communication system using multiple antennas in both transmitting and receiving ends may increase channel transmission capacity in proportion to the number of antennas without additionally allocating frequencies or Transmit (Tx) power. Another benefit of the MIMO scheme is that it allows for mitigation of inter-cell interference.

To mitigate inter-cell interference, a wireless communication system using the MIMO scheme, such as the IEEE 802.16m or the LTE Advanced systems, uses a precoding matrix for inter-cell interference mitigation. That is, in DL communication, a BS multiplies a Tx signal by the precoding matrix in order to cancel interference it is causing to a neighbor cell and maximize downlink performance within its cell. The precoding matrix used for interference mitigation is one of a plurality of precoding matrices included in a codebook, wherein each of the precoding matrices can be identified by a Precoding Matrix Index (PMI). The particular codebook used by the BS depends on the standard on which the operation of the BS is based.

A PMI coordination scheme is employed to mitigate inter-cell interference using the precoding matrix. In operation, an MS located near an edge of a cell measures the DL channel of the serving BS and any dominant interfering BSs. For convenience in explanation, it will be assumed hereafter that there is one interfering BS. The MS then determines an appropriate PMI for its serving BS and the interfering BS. When determining the PMI, the MS may determine one or both of a preferred and an unwanted PMI. Once the PMIs for the serving and interfering BS are determined, the MS feeds back the PMI for the serving BS and interfering BS to its serving BS. The serving BS utilizes the PMI intended for it and forwards the PMI for the interfering BS to the interfering BS via a backhaul. The interfering BS adjust its DL transmission based on the PMI received from the serving BS. Thereby, inference to the MS caused by the interfering BS is reduced.

However, DL channel conditions vary over time and location. As a result, there is a problem in that by the time the interfering BS applies the PMI, the DL channel conditions may have changed too much for the PMI scheme described above to be effective. In other words, the PMI scheme described above suffers from a PMI aging problem when there is too much delay between the MS measuring the DL channel and the interfering BS adjusting its transmission. The delay is primarily caused by feedback delay and backhaul delay. Feedback delay corresponds to the amount of time taken for the MS to select a PMI from all of the PMIs in the codebook and then forward the selected PMI to the serving BS. Backhaul delay corresponds to the amount of time taken to communicate the PMI received from the MS by the serving BS to the interfering BS over a backhaul connection. Furthermore, the amount of time a PMI can age before it is unreliable is inversely related to a rate of mobility of the MS. Accordingly, in practical applications the PMI scheme described above is limited to use with MSs having a low rate of mobility.

Therefore, a need exists for an apparatus and method for mitigating inter-cell interference that does not suffer the PMI aging problem and that can be used with MSs having a high rate of mobility.

SUMMARY OF THE INVENTION

An aspect of the present invention is to address at least the above-mentioned problems and/or disadvantages and to provide at least the advantages described below. Accordingly, an aspect of the present invention is to provide an apparatus and method for inter-cell interference mitigation.

In accordance with an aspect of the present invention, a method for operating a Mobile Station (MS) in a wireless communication system is provided. The method includes receiving Precoding Matrix Index (PMI) subset information from a Base Station (BS), determining downlink channel quality of the BS, determining a PMI for the BS based on the PMI subset information and the determined downlink channel quality of the BS, and transmitting the determined PMI to the BS.

In accordance with an aspect of the present invention, a method for operating a BS in a wireless communication system is provided. The method includes determining PMI subset information of the BS, transmitting the PMI subset information to an MS, receiving a PMI from the MS, and adjusting downlink transmission based on the received PMI.

In accordance with an aspect of the present invention, an apparatus for operating an MS in a wireless communication system is provided. The apparatus includes a receiver for receiving PMI subset information from a BS, a channel quality measurer for determining downlink channel quality of the BS, a PMI calculator for determining a PMI for the BS based on the PMI subset information and the determined downlink channel quality of the BS, and a transmitter for transmitting the determined PMI to the BS.

In accordance with an aspect of the present invention, an apparatus for operating a BS in a wireless communication system is provided. The apparatus includes a PMI table for storing PMI subset information of the BS, a transmitter for transmitting the PMI subset information to one or more Mobile Stations (MSs), a receiver for receiving a PMI from the MS, a PMI selector for selecting the received PMI in an interference mitigation precoder, and the interference mitigation precoder for adjusting downlink transmission based on the selected PMI.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
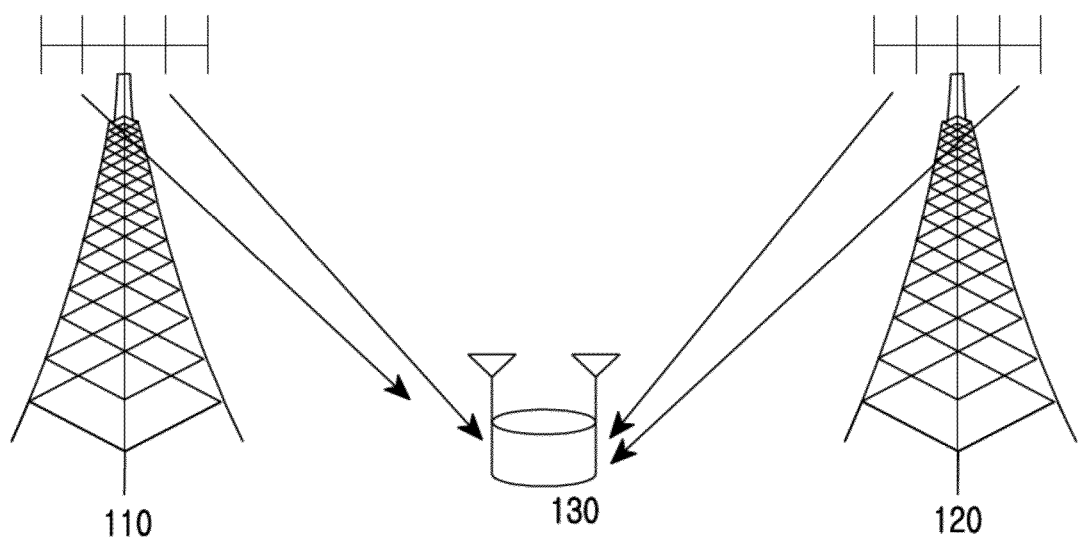
FIG. 1 is a schematic diagram for explaining the generation of inter-cell inference in a conventional wireless communication system.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention described below relate to inter-cell interference mitigation in a Multiple-Input Multiple-Output (MIMO) wireless communication system. More specifically, exemplary embodiments of the present invention described below relate to DownLink (DL) Precoding Matrix Index (PMI) coordination based on Base Station (BS) antenna configuration. Although an Orthogonal Frequency Division Multiplexing (OFDM)/Orthogonal Frequency Division Multiple Access (OFDMA)-based wireless communication system will be described hereinafter as an example, the present invention can also equally apply to other types of wireless communication systems.

It should be understood that the following description refers to terms utilized in various standards merely for simplicity of explanation. For example, the following description refers to terms utilized in the Institute of Electrical and Electronics Engineers (IEEE) 802.16m standard and the $3^{rd}$ Generation Partnership Project (3GPP) Long Term Evolution (LTE) Advanced standard. However, this description should not be interpreted as being limited to the IEEE 802.16m or 3GPP LTE Advanced standards. Independent of the mechanism used for DL PMI coordination, it is preferable to use DL PMI coordination and it is advantageous for that ability to conform to a standardized mechanism.

Inter-cell interference affects a Mobile Station (MS) that is located at or near an edge of a service area (referred to hereafter as a cell) of a serving BS. Such an MS will hereafter be referred to as cell edge MS. Furthermore, while a cell edge MS may experience interference from one or more neighboring BSs, for simplicity in explanation, the following description will be based on the scenario where there is only one dominant interfering BS.

Herein, exemplary embodiments of the present invention employ a covariance based DL PMI coordination scheme to address backhaul delay and MS mobility. An aspect of the covariance based DL PMI coordination scheme is that for each BS in a wireless communication system, it can be determined which PMIs from an entire codebook have a high probability of being either the best or worst PMIs for DL transmission from the perspective of cell edge MSs in adjacent cells, to which the DL transmission from the BS would experience interference. The PMIs for DL transmission for each BS are determined based on a BS antenna configuration. If the BS recommends the best PMIs and/or restricts the worst PMIs for DL transmission, the average interference to an MS in an adjacent cell will be reduced. If each BS in the wireless communication system implements the covariance based DL PMI coordination scheme, interference to cell edge MSs can be mitigated system wide without the need to feedback PMIs for interfering BSs, thereby addressing backhaul delay and MS mobility.

The covariance based DL PMI coordination scheme according to exemplary embodiments of the present invention is based on a transmit correlation matrix of the interfering BS and an explanation thereof is hereafter provided. A received DL signal (y) for a cell edge MS may be expressed as:

$$y = vH_w R_d^{1/2} w_d x_d + v H_w R_{d\_I}^{1/2} w_{d\_I} x_{D\_I} + n \quad \text{Equation (1)}$$

where v denotes a receiver combining vector, $H_w$ denotes the channel matrix, $R_d$ denotes a transmit correlation matrix of the serving BS, $R_{d\_I}$ denotes a transmit correlation matrix of the interfering BS, $w_d$ denotes a PMI for the cell edge MS for the serving BS, $w_{d\_I}$ denotes a PMI for the cell edge MS for the interfering BS, $x_d$ denotes a transmitted data stream of the serving BS, $x_{d\_I}$ denotes a transmitted data stream of the interfering BS, and n denotes the received noise.

Accordingly, assuming a Maximum Ratio Combining (MRC) receiver at the MS, the average received signal power of the interference link may be expressed as:

$$E(|vH_w R_{d\_I}^{1/2} w_{d\_I} x_{d\_I}|^2),$$

where $$E(|vH_w R_{d\_I}^{1/2} w_{d\_I} x_{d\_I}|^2) = |vR_{d\_I}^{1/2} w_{d\_I}|^2. \quad \text{Equation (2)}$$

Given two different combining vectors, different PMIs will be selected, thereby indicating that these two vectors need a joint design. Since the average interference power is $|vR_{d\_I}^{1/2} w_{d\_I}|^2$, the preferred (best) PMI may be expressed as:

$$w^*_{best} = \arg\min |vR_{d\_I}^{1/2} w_{d\_I}|^2 \quad \text{Equation (3)}$$

where the best PMI is the PMI that results in the weakest average interference power. In contrast, the worst PMI may be expressed as:

$$w^*_{worst} = \arg\max |vR_{d\_I}^{1/2} w_{d\_I}|^2 \quad \text{Equation (4)}$$

where the worst PMI is the PMI that results in the strongest average interference power.

Herein, it is noted that the transmit correlation matrix may be different for each MS and an explanation thereof is hereafter provided. Once a per-tap Angular Spread (AS), mean Angle of Arrival (AoA), and mean Angle of Departure (AoD) are defined, the theoretical spatial correlation at both BS and MS can be derived, assuming Laplacian power angular distribution. Further, assuming an omni directional antenna configuration at the BS and MS, antenna spatial correlation between a $p^{th}$ and $q^{th}$ antenna at the BS may be expressed as:

$$r_{n,BS}(p,q) = \int_{-\infty}^{\infty} f(\alpha) \exp\left\{ j \frac{2\pi d_{BS}}{\lambda}(p-q)\sin(AOD_n + \alpha) \right\} d\alpha \quad \text{Equation (5)}$$

where $d_{BS}$ denotes antenna spacing at the BS, $\lambda$, denotes wavelength, and $\alpha$ denotes angular offset around the mean AoD at the BS. The Probability Density Function (PDF) of the angular offset may be expressed as:

$$f(\alpha) = \frac{1}{\sqrt{2}\, AS_{BS,Path}} \exp\left\{-\frac{\sqrt{2}\,|\alpha|}{AS_{BS,Path}}\right\}. \quad \text{Equation (6)}$$

Accordingly, from Equation (5), it can be understood that the transmit correlation matrix for each MS may be different due to different AoDs. Therefore, the transmit correlation matrix should be calculated for each MS, from which the PMI yielding the largest received signal may be determined.

In an exemplary implementation, a covariance based DL PMI coordination scheme based on BS antenna configuration is divided into a first process in which a PMI subset for a BS is determined and a second process in which the BS and an MS interact to select a PMI from the BS's PMI subset.

An exemplary process for determining a PMI subset for a BS is described below.

A PMI subset for a BS is determined by collecting the probability of each PMI being the best PMI using Equation (3) and the worst PMI using Equation (4), hereafter referred to as the recommendation probability and the restriction probability, respectively. The recommendation and the restriction probabilities may be determined during actual operation of the BS, a setting procedure of the BS, a mathematical simulation, or any other mechanism by which the probabilities of the best and worst PMI may be determined. The recommendation and the restriction probabilities are determined based on an antenna configuration of the BS. Exemplary antenna configurations include a 360 degree coverage (omni directional) antenna configuration, a 120 degree coverage (three sector) antenna configuration, and a 60 degree coverage (six sector) antenna configuration.

To provide a better understanding of the collection of the recommendation and the restriction probabilities, an example of a collection of restriction probabilities is described below with reference to FIG. 2

Figure 2:
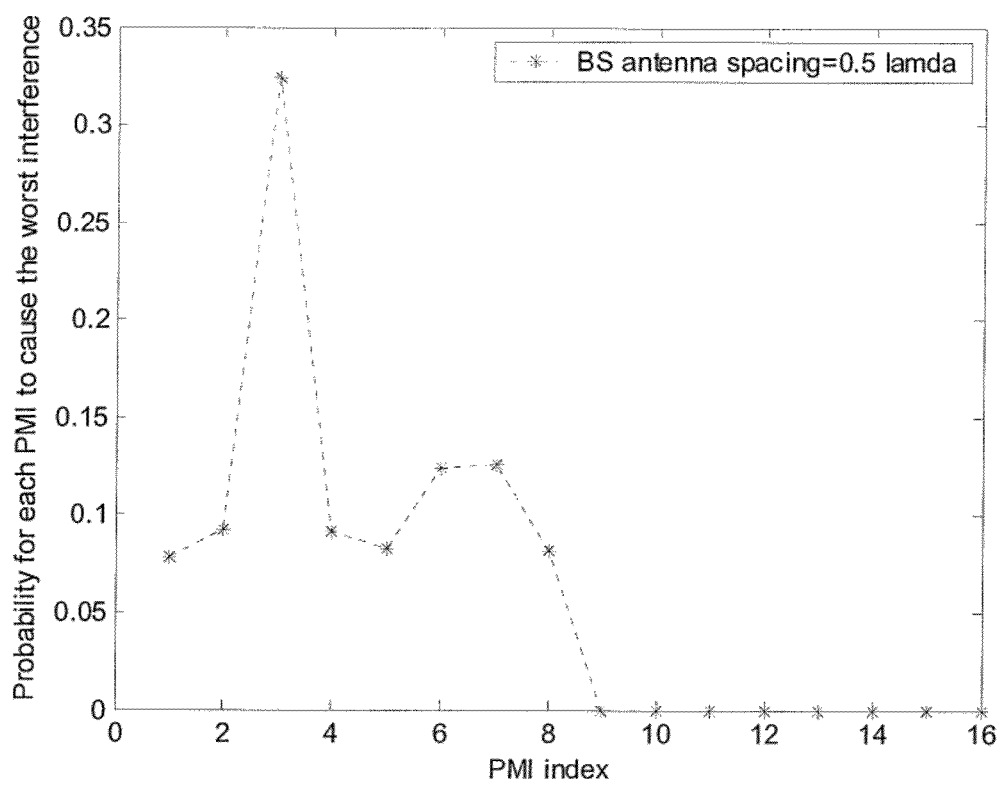
FIG. 2 is a graph showing the results of a simulation in which Precoding Matrix Index (PMI) restriction probabilities are collected based on a $3^{rd}$ Generation Partnership Project (3GPP) Long Term Evolution (LTE) Advanced (LTE Advanced) 4 bit codebook (rank 1) for a Base Station (BS) with an omni directional antenna configuration having an antenna spacing set at 0.5 lambda, according to an exemplary embodiment of the present invention.

FIG. 2 is a graph showing the results of a simulation in which PMI restriction probabilities are collected based on an LTE Advanced 4 bit codebook (rank 1) for a BS with an omni directional antenna configuration having an antenna spacing set at 0.5 lambda, according to an exemplary embodiment of the present invention.

Referring to FIG. 2, the number of PMIs having a high probability of being the worst PMI is small. Accordingly, if the BS restricts this small number of PMIs in its DL transmission to the MSs in the center of its cell, the average interference to MSs in other cells will be reduced.

In order to evaluate the effects of different antenna spacing, the simulation performed for FIG. 2 was repeated with the same parameters except for the antenna spacing.

Figure 3:
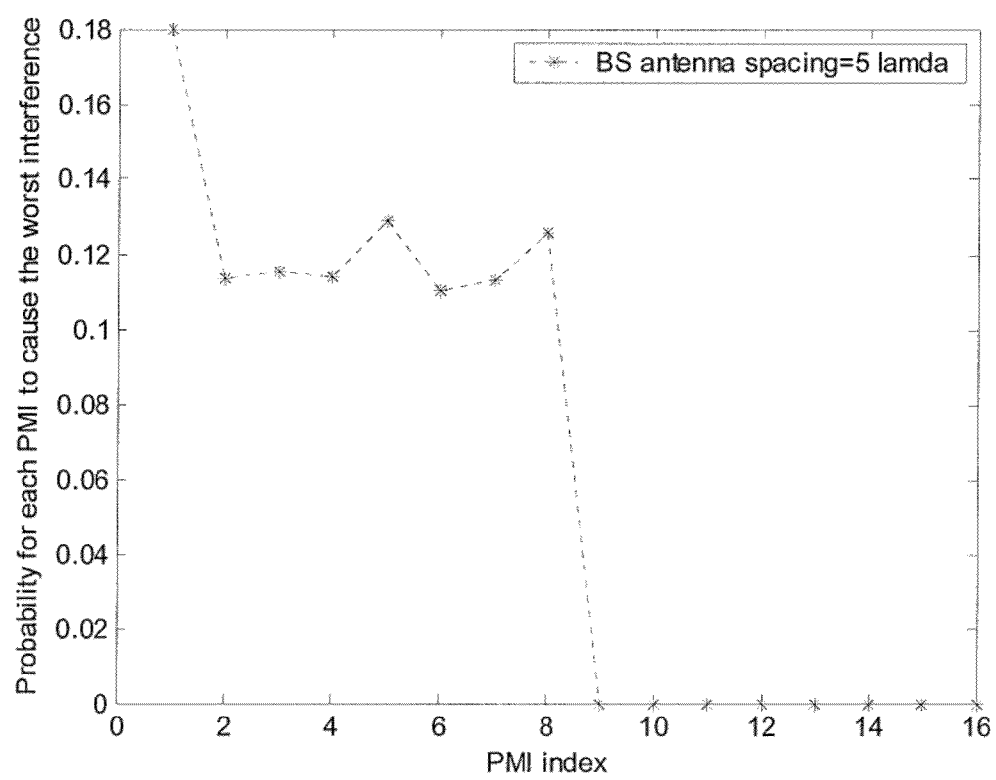
FIG. 3 is a graph showing the results of a simulation in which PMI restriction probabilities are collected based on an LTE Advanced 4 bit codebook (rank 1) for a BS with an omni directional antenna configuration having an antenna spacing set at 5 lambda, according to an exemplary embodiment of the present invention.

FIG. 3 is a graph showing the results of a simulation in which PMI restriction probabilities are collected based on an LTE Advanced 4 bit codebook (rank 1) for a BS with an omni directional antenna configuration having an antenna spacing set at 5 lambda, according to an exemplary embodiment of the present invention.

Figure 4:
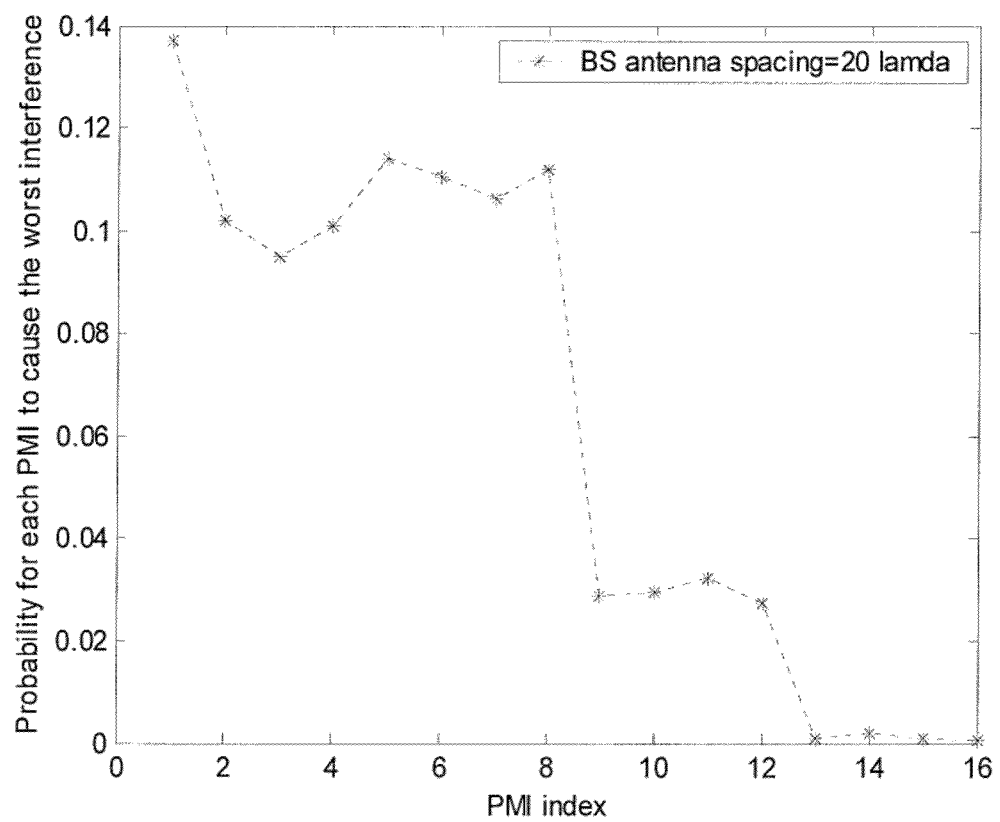
FIG. 4 is a graph showing the results of a simulation in which PMI restriction probabilities are collected based on an LTE Advanced 4 bit codebook (rank 1) for a BS with an omni directional antenna configuration having an antenna spacing set at 20 lambda, according to an exemplary embodiment of the present invention.

FIG. 4 is a graph showing the results of a simulation in which PMI restriction probabilities are collected based on an LTE Advanced 4 bit codebook (rank 1) for a BS with an omni directional antenna configuration having an antenna spacing set at 20 lambda, according to an exemplary embodiment of the present invention.

As observed in FIGS. 2-4, as antenna spacing increases from 0.5 lambda to 20 lambda, the number of restricted PMIs will increase, but the number of dominant PMIs remains almost unchanged.

Since LTE Advanced and IEEE 802.16m codebooks are very similar, the observations deduced from FIGS. 2-4 would similarly apply to an IEEE 802.16m codebook. Examples in which an IEEE 802.16m codebook is employed is provided further below. Furthermore, the scheme used in FIGS. 2-4 may also be used for PMI recommendation. Examples of the scheme used in FIGS. 2-4 being used for PMI recommendation is provided further below.

Hereafter, examples of collected recommendation and the restriction probabilities are described below with reference to FIGS. 5-10 for three different antenna configurations for both the LTE Advanced and IEEE 802.16m codebooks. In each of FIGS. 5-10, antenna spacing is set to less than 1 lambda.

Figure 5:
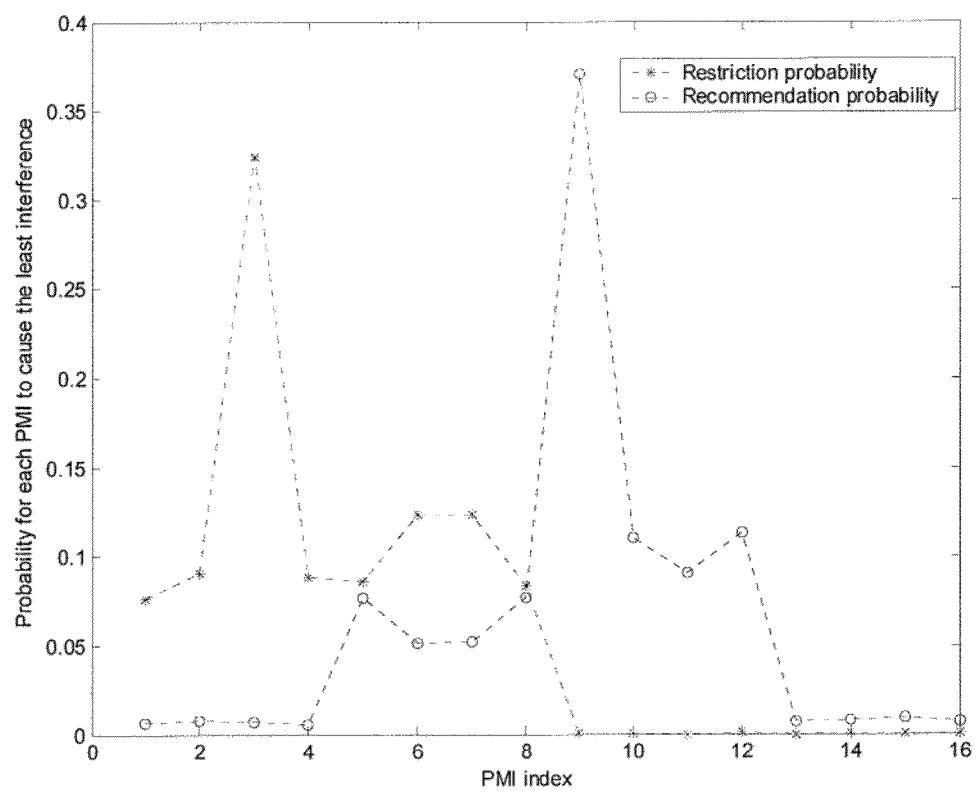
FIG. 5 is a graph showing the results of a simulation in which PMI recommendation and restriction probabilities are collected for a BS operating with an LTE Advanced 4 bit codebook (rank 1) and an omni directional antenna configuration having an antenna spacing set to less than 1 lambda, according to an exemplary embodiment of the present invention.

FIG. 5 is a graph showing the results of a simulation in which PMI recommendation and restriction probabilities are collected for a BS operating with an LTE Advanced 4 bit codebook (rank 1) and an omni directional antenna configuration having an antenna spacing set to less than 1 lambda, according to an exemplary embodiment of the present invention.

Figure 6:
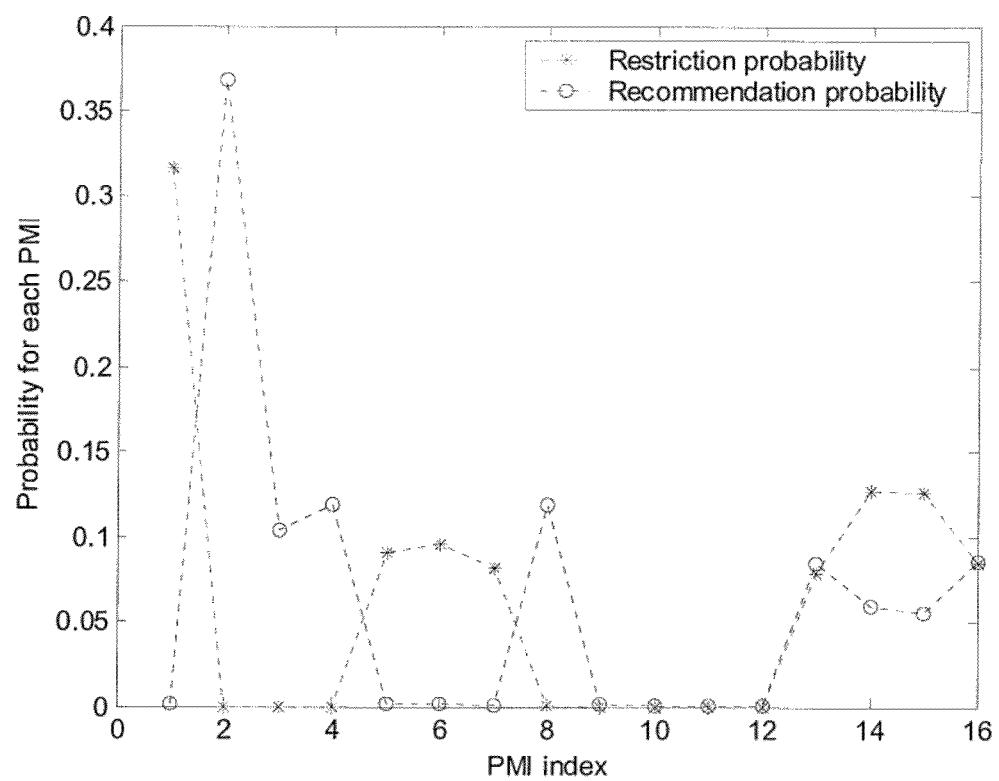
FIG. 6 is a graph showing the results of a simulation in which PMI recommendation and restriction probabilities are collected for a BS operating with an LTE Advanced 4 bit codebook (rank 1) and a 120 degree coverage antenna configuration having an antenna spacing set to less than 1 lambda, according to an exemplary embodiment of the present invention.

FIG. 6 is a graph showing the results of a simulation in which PMI recommendation and restriction probabilities are collected for a BS operating with an LTE Advanced 4 bit codebook (rank 1) and a 120 degree coverage antenna configuration having an antenna spacing set to less than 1 lambda, according to an exemplary embodiment of the present invention.

Figure 7:
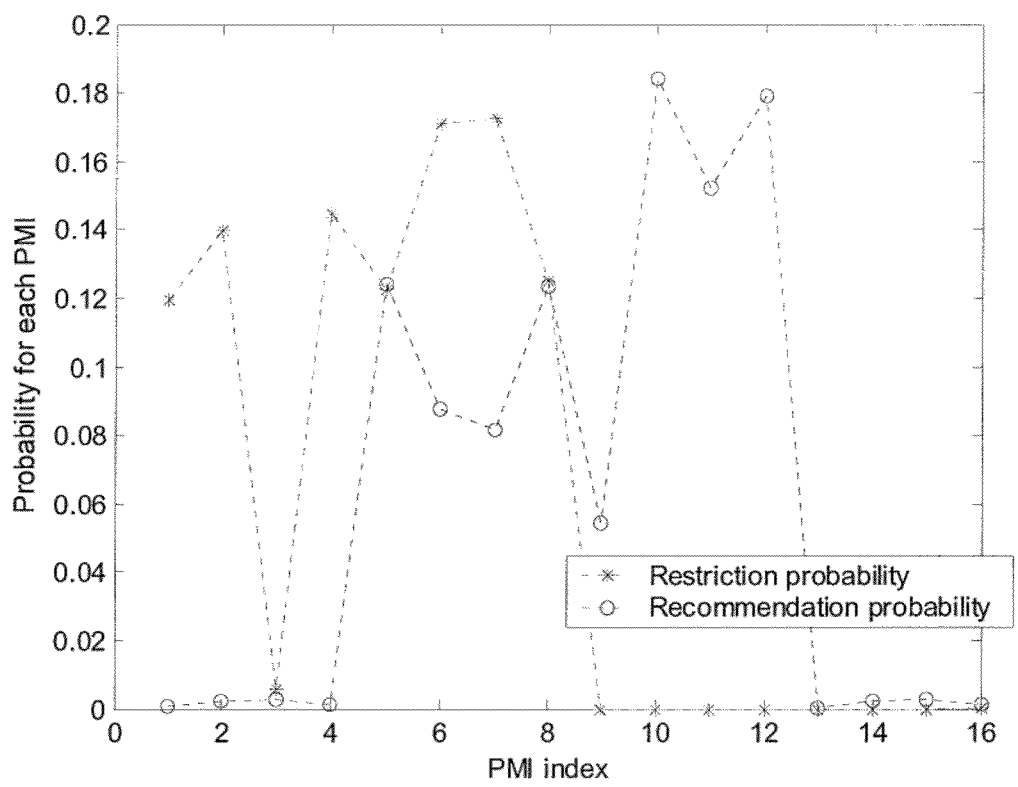
FIG. 7 is a graph showing the results of a simulation in which PMI recommendation and restriction probabilities are collected for a BS operating with an LTE Advanced 4 bit codebook (rank 1) and a 60 degree coverage antenna configuration having an antenna spacing set to less than 1 lambda, according to an exemplary embodiment of the present invention.

FIG. 7 is a graph showing the results of a simulation in which PMI recommendation and restriction probabilities are collected for a BS operating with an LTE Advanced 4 bit codebook (rank 1) and a 60 degree coverage antenna configuration having an antenna spacing set to less than 1 lambda, according to an exemplary embodiment of the present invention.

Figure 8:
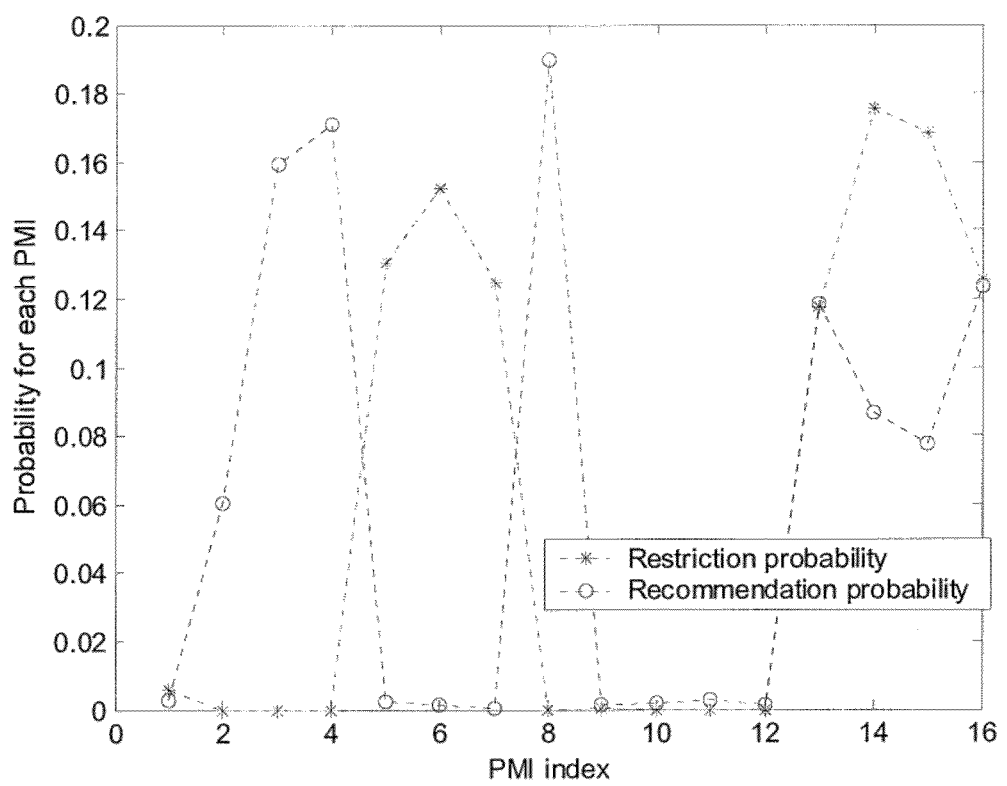
FIG. 8 is a graph showing the results of a simulation in which PMI recommendation and restriction probabilities are collected for a BS operating with an Institute of Electrical and Electronics Engineers (IEEE) 802.16m 4 bit codebook (rank 1) and an omni directional antenna configuration having an antenna spacing set to less than 1 lambda, according to an exemplary embodiment of the present invention.

FIG. 8 is a graph showing the results of a simulation in which PMI recommendation and restriction probabilities are collected for a BS operating with an IEEE 802.16m 4 bit codebook (rank 1) and an omni directional antenna configuration having an antenna spacing set to less than 1 lambda, according to an exemplary embodiment of the present invention.

Figure 9:
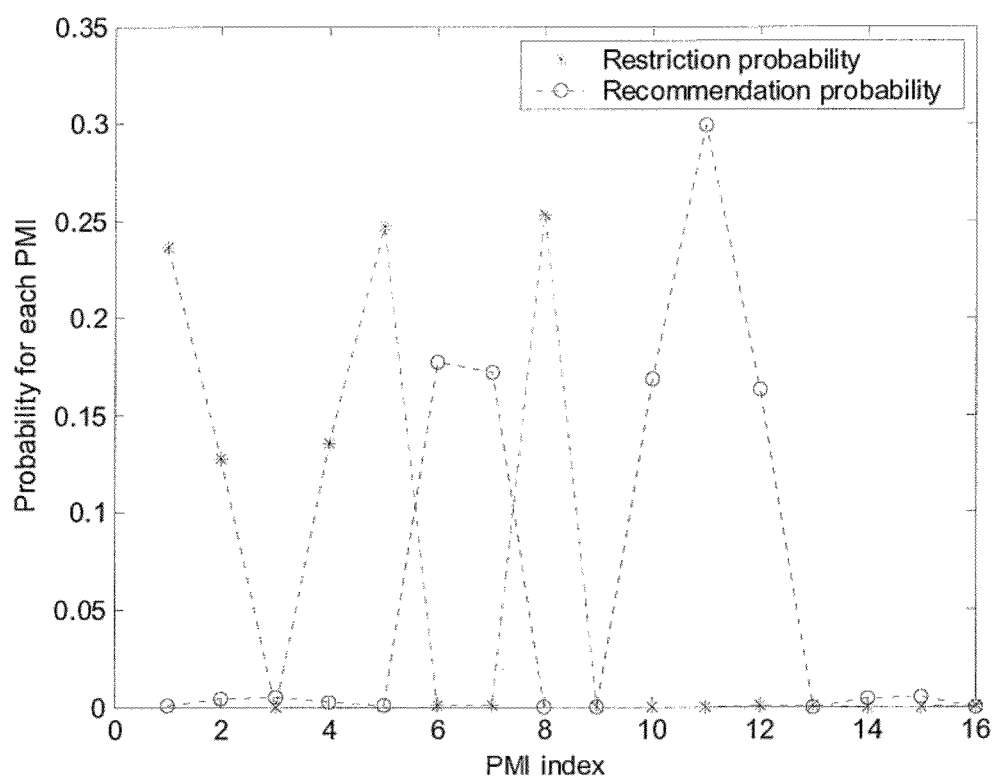
FIG. 9 is a graph showing the results of a simulation in which PMI recommendation and restriction probabilities are collected for a BS operating with an IEEE 802.16m 4 bit codebook (rank 1) and a 120 degree coverage antenna configuration having an antenna spacing set to less than 1 lambda, according to an exemplary embodiment of the present invention.

FIG. 9 is a graph showing the results of a simulation in which PMI recommendation and restriction probabilities are collected for a BS operating with an IEEE 802.16m 4 bit codebook (rank 1) and a 120 degree coverage antenna configuration having an antenna spacing set to less than 1 lambda, according to an exemplary embodiment of the present invention.

Figure 10:
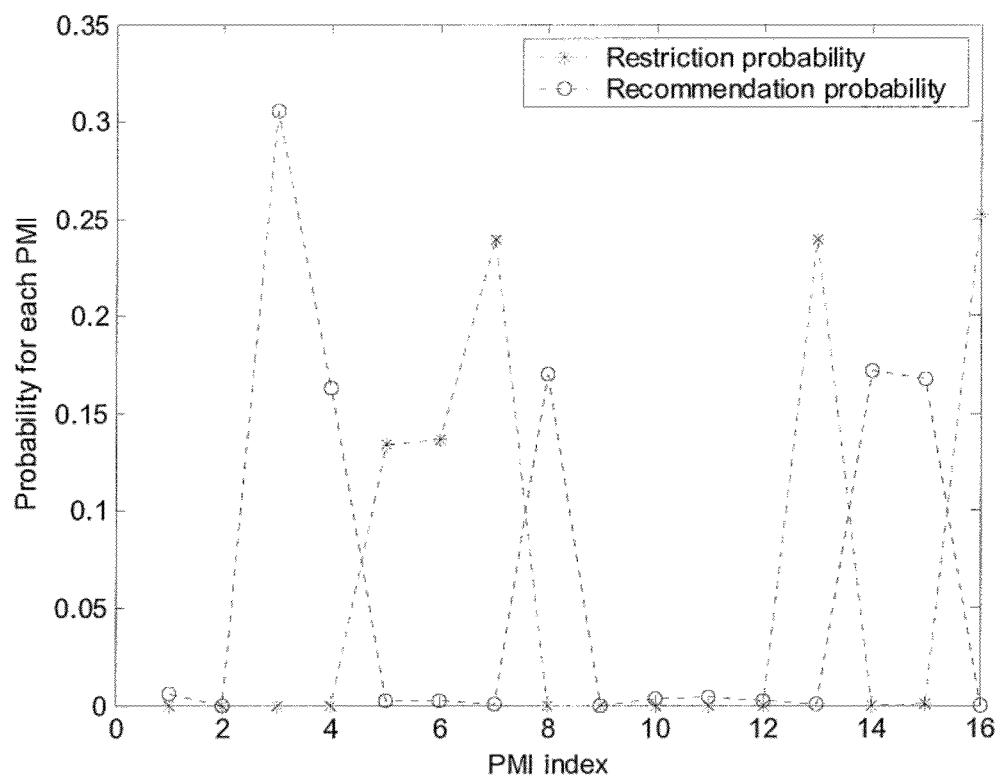
FIG. 10 is a graph showing the results of a simulation in which PMI recommendation and restriction probabilities are collected for a BS operating with an IEEE 802.16m 4 bit codebook (rank 1) and a 60 degree coverage antenna configuration having an antenna spacing set to less than 1 lambda, according to an exemplary embodiment of the present invention.

FIG. 10 is a graph showing the results of a simulation in which PMI recommendation and restriction probabilities are collected for a BS operating with an IEEE 802.16m 4 bit codebook (rank 1) and a 60 degree coverage antenna configuration having an antenna spacing set to less than 1 lambda, according to an exemplary embodiment of the present invention.

Once the recommendation and restriction probabilities are collected, as exemplified above in FIGS. 5-10, the PMI subset for the BS may be selected for each antenna configuration and codebook type. The PMI subset selection criteria is as follows:

1) PMIs are restricted that have a higher restriction probability but a lower recommendation probability.

2) PMIs are recommended that have a lower restriction probability but a higher recommendation probability.

Based upon the PMI subset selection criteria, a PMI subset is determined from the collected recommendation and restriction probabilities. The PMI subset may be referred to as a PMI_subset_indicator. Once the PMI_subset_indicator for a BS is determined, it may be stored at the BS. When the PMI subset selection criteria is applied to each of the collected recommendation and restriction probabilities exemplified above in FIGS. 5-10, the PMI_subset_indicators shown in Tables 1-6, respectively, are generated.

An exemplary PMI_subset_indicator derived from the collected recommendation and restriction probabilities exemplified in FIG. 5 is provided below in Table 1. Table 1 shows the PMI_subset_indicator for a BS operating with an LTE Advanced 4 bit codebook (rank 1) and an omni directional antenna configuration having an antenna spacing set to less than 1 lambda.

TABLE 1

| PMI_subset_indicator | PMI index | | | |
|---|---|---|---|---|
| 0b00 (restriction) | 1 | 2 | 4 | |
| 0b01 (recommendation) | 9 | 10 | 11 | 12 |

An exemplary PMI_subset_indicator derived from the collected recommendation and restriction probabilities exemplified in FIG. 6 is provided below in Table 2. Table 2 shows the PMI_subset_indicator for a BS operating with an LTE Advanced 4 bit codebook (rank 1) and a 120 degree coverage antenna configuration having an antenna spacing set to less than 1 lambda.

TABLE 2

| PMI_subset_indicator | PMI index | | | |
|---|---|---|---|---|
| 0b00 (restriction) | 1 | 2 | 4 | |
| 0b01 (recommendation) | 9 | 10 | 11 | 12 |

An exemplary PMI_subset_indicator derived from the collected recommendation and restriction probabilities exemplified in FIG. 7 is provided below in Table 3. Table 3 shows the PMI_subset_indicator for a BS operating with an LTE Advanced 4 bit codebook (rank 1) and a 60 degree coverage antenna configuration having an antenna spacing set to less than 1 lambda.

TABLE 3

| PMI_subset_indicator | PMI index | | | |
|---|---|---|---|---|
| 0b10 (restriction) | 1 | 2 | 4 | 5 | 8 |
| 0b11 (recommendation) | 6 | 7 | 10 | 11 | 12 |

An exemplary PMI_subset_indicator derived from the collected recommendation and restriction probabilities exemplified in FIG. 8 is provided below in Table 4. Table 4 shows the PMI_subset_indicator for a BS operating with an IEEE 802.16m 4 bit codebook (rank 1) and an omni directional antenna configuration having an antenna spacing set to less than 1 lambda.

TABLE 4

| PMI_subset_indicator | PMI index | | | |
|---|---|---|---|---|
| 0b000 (restriction) | 1 | 5 | 6 | 7 |
| 0b001 (recommendation) | 2 | 3 | 4 | 8 |

An exemplary PMI_subset_indicator derived from the collected recommendation and restriction probabilities exemplified in FIG. 9 is provided below in Table 5. Table 5 shows the PMI_subset_indicator for a BS operating with an IEEE 802.16m 4 bit codebook (rank 1) and a 120 degree antenna configuration having an antenna spacing set to less than 1 lambda.

TABLE 5

| PMI_subset_indicator | PMI index | | | |
|---|---|---|---|---|
| 0b010 (restriction) | 5 | 6 | 7 | |
| 0b000 (recommendation) | 2 | 3 | 4 | 8 |

An exemplary PMI_subset_indicator derived from the collected recommendation and restriction probabilities exemplified in FIG. 10 is provided below in Table 6. Table 6 shows the PMI_subset_indicator for a BS operating with an IEEE 802.16m 4 bit codebook (rank 1) and a 60 degree antenna configuration having an antenna spacing set to less than 1 lambda.

TABLE 6

| PMI_subset_indicator | PMI index | | | | |
|---|---|---|---|---|---|
| 0b011 (restriction) | 5 | 6 | 7 | 13 | 16 |
| 0b100 (recommendation) | 3 | 4 | 8 | 14 | 15 |

Once the PMI_subset_indicator is determined for a BS, based on the antenna configuration and codebook used by a BS, the PMI_subset_indicator may be stored at the BS, which broadcasts or unicasts the PMI_subset_indicator via a control channel to cell edge MSs.

An exemplary process in which the BS and an MS interact to select a PMI is described below.

Figure 11:
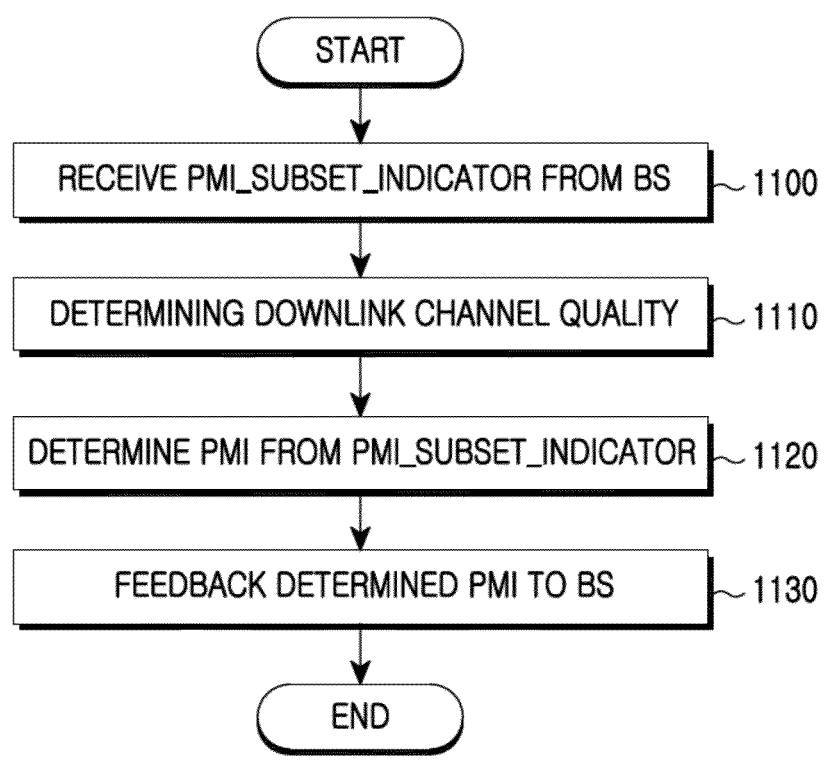
FIG. 11 is a flowchart illustrating an operation of a Mobile Station (MS) in a wireless communication system according to an exemplary embodiment of the present invention.

FIG. 11 is a flowchart illustrating an operation of an MS in a wireless communication system according to an exemplary embodiment of the present invention.

Referring to FIG. 11, the MS receives a PMI_subset_indicator from a BS in step 1100. The PMI_subset_indicator may be transmitted to the MS by broadcast or unicast. The PMI_subset_indicator may be transmitted to the MS periodically. When transmitted to the MS, the PMI_subset_indicator may be transmitted via subchannels allocated to the MS. In step 1110, the MS determines the DL channel quality of the BS. The DL channel quality of the BS may be determined based on a downlink reference signal, such as a midamble, etc. In step 1120, the MS determines the PMI according to the PMI_subset_indicator and the determined DL channel quality of the BS. Here the MS does not evaluate the PMIs indicated by the PMI_subset_indicator as being restricted. In step 1130, the MS feeds back the determined PMI to the BS. Thereafter, the process ends.

Figure 12:
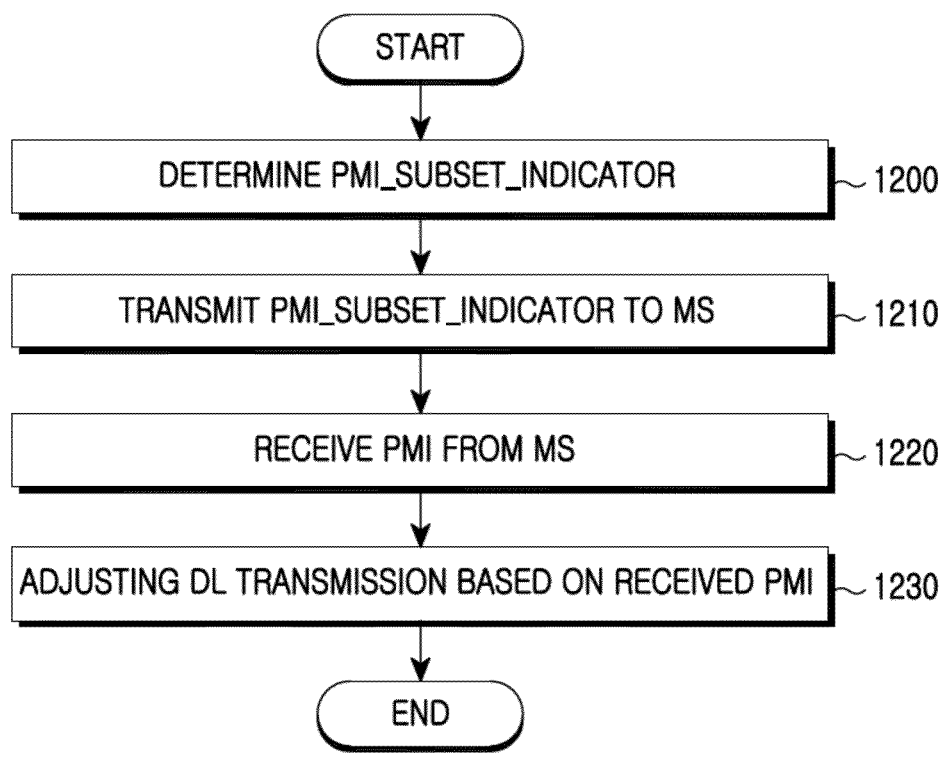
FIG. 12 is a flowchart illustrating an operation of a BS in a wireless communication system according to an exemplary embodiment of the present invention.

FIG. 12 is a flowchart illustrating an operation of a BS in a wireless communication system according to an exemplary embodiment of the present invention.

Referring to FIG. 12, the BS determines its PMI_subset_indicator in step 1200. The BS may determine its PMI_subset_indicator as described above. The PMI_subset_indicator is transmitted to the MS in step 1210. The PMI_subset_indicator may be transmitted to the MS by broadcast or unicast. The PMI_subset_indicator may be transmitted to the MS periodically. The transmission of the PMI_subset_indicator may occur in response to receiving a request for coordination from an adjacent BS. When transmitted to the MS, the PMI_subset_indicator may be transmitted via subchannels allocated to the MS. In step 1220, the BS receives the PMI determined by the MS. In step 1230, the BS adjusts its DL transmission based on the received the PMI received from the MS. Thereafter, the process ends.

Figure 13:
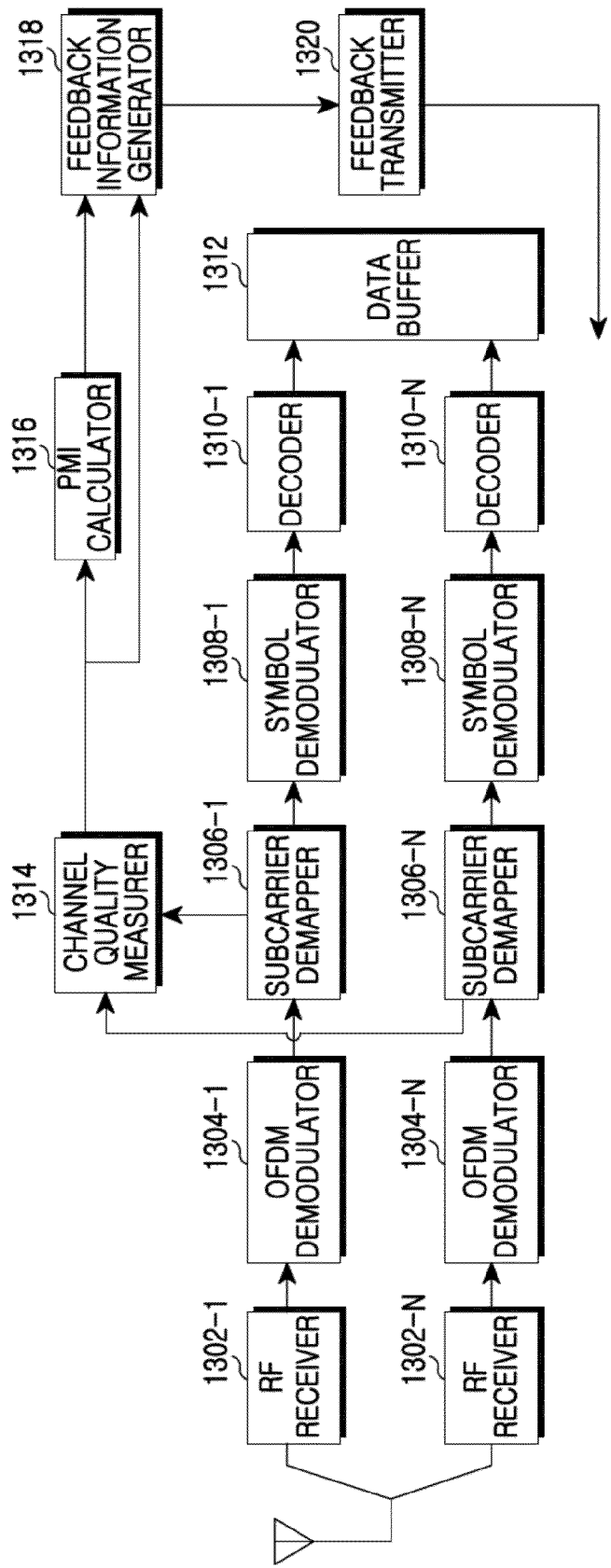
FIG. 13 is a block diagram illustrating a structure of an MS in a wireless communication system according to an exemplary embodiment of the present invention.

FIG. 13 is a block diagram illustrating a structure of an MS in a wireless communication system according to an exemplary embodiment of the present invention.

Referring to FIG. 13, the MS includes a plurality of Radio Frequency (RF) receivers 1302-1 to 1302-N, a plurality of OFDM demodulators 1304-1 to 1304-N, a plurality of subcarrier demappers 1306-1 to 1306-N, a plurality of symbol demodulators 1308-1 to 1308-N, a plurality of decoders 1310-1 to 1310-N, a data buffer 1312, a channel quality measurer 1314, a PMI calculator 1316, a feedback information generator 1318, and a feedback transmitter 1320.

Each of the RF receivers 1302-1 to 1302-N converts an RF signal received through an antenna into a baseband signal. Each of the RF receivers 1302-1 to 1302-N divides the baseband signal on an OFDM symbol basis, removes a Cyclic Prefix (CP), and restores complex symbols mapped to a frequency domain by performing a Fast Fourier Transform (FFT) operation. Each of the symbol demodulators 1308-1 to 1308-N demodulates the complex symbols to convert them into encoded bit-streams. Each of the decoders 1310-1 to 1310-N decodes the encoded bit-streams. The data buffer 1312 temporarily stores information bit-streams decoded by the decoders 1310-1 to 1310-N. Included in the information bit-streams is the PMI_subset_indicator, which is either broadcast or unicast to the MS from the BS via a control channel. The PMI_subset_indicator may be broadcast or unicast to the MS from the BS in subbands allocated to the MS.

The channel quality measurer 1314 measures channel quality for a serving BS by using signals provided from the subcarrier demappers 1306-1 to 1306-N. In other words, the channel quality measurer 1314 determines the channel quality of a signal, which is received from the serving BS through a subchannel allocated by the serving BS. The channel quality may be one of a Signal-to-Noise (SNR), a Carrier to Interference-plus-Noise Ratio (CINR), and a Signal to Interference-plus-Noise Ratio (SINR). In addition, the channel quality measurer 1314 may determine interference power from interfering BSs.

The PMI calculator 1316 calculates a PMI according to the PMI_subset_indicator received from the BS. That is, the PMI calculator 1316 calculates a best case PMI that minimizes interference or a worst case PMI that maximizes interference from the PMI subset indicated in the PMI_subset_indicator. Further, the PMI calculator 1316 provides the calculated PMI to the feedback information generator 1318, and may report whether the provided PMI is the best case PMI or the worst case PMI.

The feedback information generator 1318 generates information to be fed back to the serving BS. The information to be fed back to the serving BS may include channel quality information such as SNR, CINR, and SINR. When performing open-loop MIMO communication, the MS feeds back an effective SINR for each codeword, a MIMO communication scheme, a transmission rank, etc. When performing a closed-loop MIMO communication, the MS feedbacks an effective SINR for each codeword, a transmission rank, a PMI for a single-user scheme, and a PMI for a multi-user scheme or the like. The PMI for the single-user scheme and the PMI for the multi-user scheme are used for communication between the serving BS and the MS.

The feedback transmitter 1320 transmits feedback information generated by the feedback information generator 1318 to the serving BS. That is, the feedback transmitter 1320 converts the information generated by the feedback information generator 1318 into a signal by performing encoding and demodulation, configures an OFDM symbol by performing an Inverse Fast Fourier Transform (IFFT) operation and a CP inserting operation, and then transmits the OFDM symbol through one or more antennas.

Figure 14:
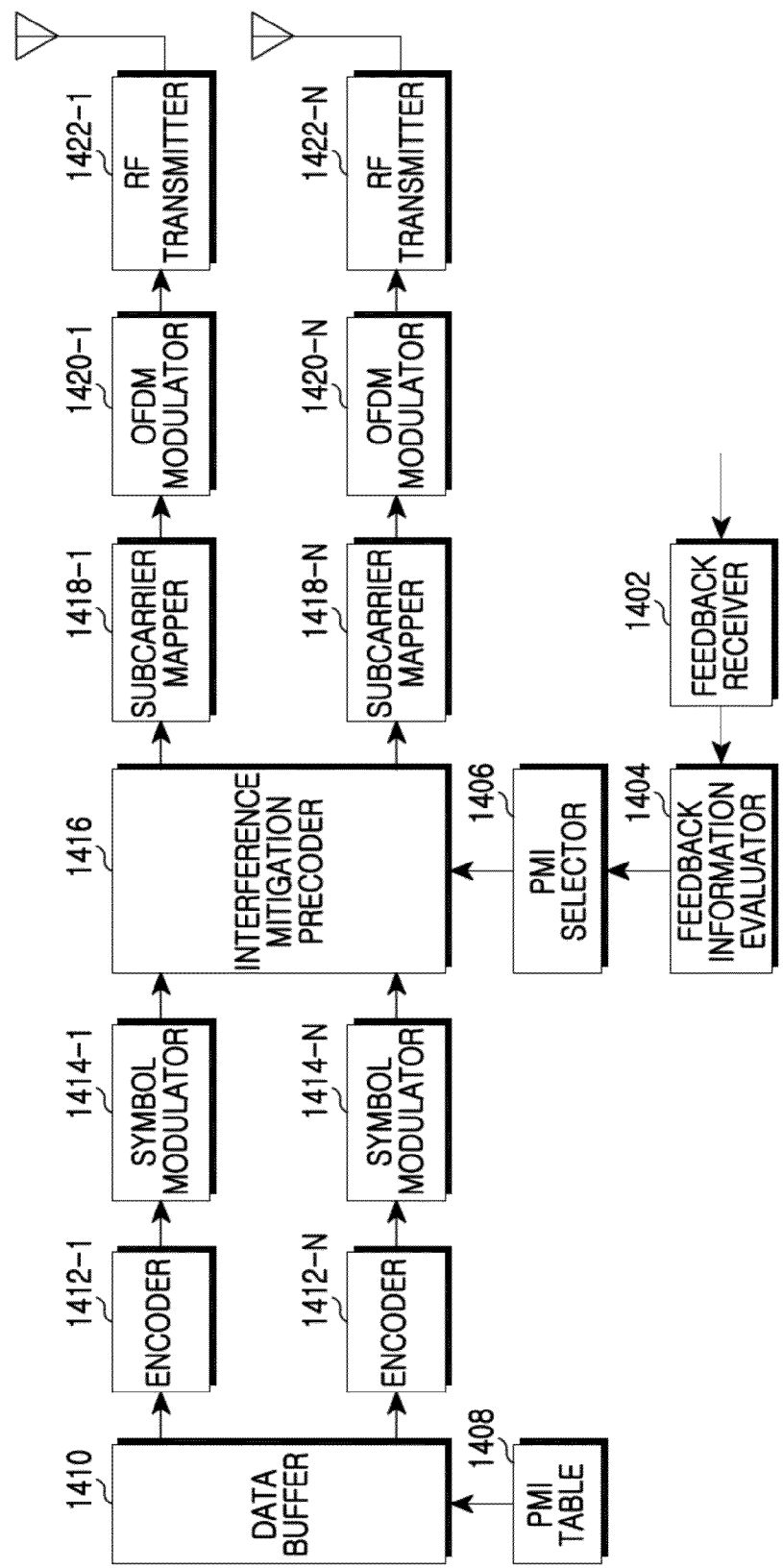
FIG. 14 is a block diagram illustrating a structure of a BS in a wireless communication system according to an exemplary embodiment of the present invention.

FIG. 14 is a block diagram illustrating a structure of a BS in a wireless communication system according to an exemplary embodiment of the present invention.

Referring to FIG. 14, the BS includes a feedback receiver 1402, a feedback information evaluator 1404, a PMI selector 1406, a PMI table 1408, a data buffer 1410, a plurality of encoders 1412-1 to 1412-N, a plurality of symbol modulators 1414-1 to 1414-N, an interference mitigation precoder 1416, a plurality of subcarrier mappers 1418-1 to 1418-N, a plurality of OFDM modulators 1420-1 to 1420-N, and a plurality of RF transmitters 1422-1 to 1422-N.

The feedback receiver 1402 receives an RF signal received through one or more antennas, converts the received signal into a baseband signal which is divided on an OFDM symbol basis, removes a CP, restores complex symbols mapped to a frequency domain by performing a FFT operation, demodulates the complex symbols to convert them into encoded bit-streams, and decodes the encoded bit-streams which includes information fed back from an MS.

The feedback information evaluator 1404 evaluates the information fed back from the MS that is received by the feedback receiver 1402. In particular, the feedback information evaluator 1404 evaluates the channel quality and PMI information fed back from the MS. The PMI fed back from the MS is either the best case PMI or the worst case PMI. A PMI type indicator may indicate whether the PMI is the best case PMI or the worst case PMI.

The PMI selector 1406 selects a PMI to be used by the BS for the DL transmission to the MS. In this case, the PMI selector 1406 selects a PMI from its PMI subset based on the PMI fed back from the MS.

The PMI table 1408 stores the PMI_subset_indicator for the BS. The PMI table 1408 outputs the PMI_subset_indicator directly or indirectly to the data buffer 1410 for transmission to MSs.

The data buffer 1410 temporarily stores data to be transmitted to the BS, and outputs the stored data when a transmission time elapses. Each of the encoders 1412-1 to 1412-N encodes a data bit-stream provided from the data buffer 1410. Each of the symbol modulators 1414-1 to 1414-N modulates the encoded bit-stream and thus converts the bit-stream into complex symbols. The interference mitigation precoder 1416 performs precoding for inter-cell interference mitigation. That is, the interference mitigation precoder 1416 performs precoding on Tx signals by using a precoding matrix corresponding to a PMI selected by the PMI selector 1408. In other words, the interference mitigation precoder 1416 multiplies the Tx signals by the precoding matrix corresponding to the selected PMI.

Each of the subcarrier mappers 1418-1 to 1418-N maps Tx signals, which are on its corresponding transmission path among the precoded Tx signals, onto subcarriers and thus configures frequency-domain signals. Each of the OFDM modulators 1420-1 to 1420-N converts the frequency-domain signals into time-domain signals by performing an IFFT operation, and then configures baseband OFDM symbols by inserting a CP. Each of the RF transmitters 1422-1 to 1422-N converts the baseband OFDM symbols into an RF signal, and then transmits the RF signal through an antenna. Included in the transmitted signals, within a control channel that is either broadcast or unicast, is a PMI_subset_indicator. Examples of the PMI_subset_indicator are found above in Tables 1-6.

Accordingly, exemplary embodiments of the present invention employ a covariance based DL PMI coordination scheme to address backhaul delay and MS mobility. The PMIs for DL transmission for each BS are determined based on a BS antenna configuration.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a Mobile Station (MS) in a wireless communication system, the method comprising:
    receiving, by the MS, Precoding Matrix Index (PMI) subset information from a Base Station (BS), the PMI subset information, received by the MS from the BS, including at least one PMI that is restricted and at least one PMI that is recommend from among a plurality of PMIs;
    determining, by the MS, downlink channel quality of the BS;
    determining, by the MS, a PMI based on the PMI subset information and the determined downlink channel quality of the BS; and
    transmitting, by the MS, the determined PMI to the BS,
    wherein each one of the plurality of PMIs respectively indicates a precoding matrix from among a plurality of precoding matrices,
    wherein the at least one PMI that is restricted and the at least on PMI that is recommended are respectively determined based on a probability of being a worst PMI and a probability of being a best PMI, and
    wherein the probability of being the worst PMI and the probability of being the best PMI are determined based on at least one of an antenna configuration of the BS and an antenna spacing.

2. The method of claim 1, wherein the PMI subset information is received in one of unicast and broadcast from the BS in a control channel over subbands allocated to the MS.

3. The method of claim 1, wherein the antenna configuration of the BS includes one of a 360 degree coverage antenna configuration, a 60 degree coverage antenna configuration, and a 120 degree coverage antenna configuration.

4. The method of claim 1, wherein the PMI subset information is based on a probability of PMIs in a codebook being a best PMI that minimizes interference to an MS and a worst PMI that maximizes interference to an MS.

5. The method of claim 4, wherein the PMI subset information comprises a subset of PMIs included in the codebook, and
    further wherein, based on the probability of PMIs in a codebook being the best PMI and the worst PMI, the subset comprises restricted PMIs that each have a restriction probability that is higher than a recommendation probability, and recommended PMIs that each have a restriction probability that is lower than a recommendation probability.

6. A method for operating a Base Station (BS) in a wireless communication system, the method comprising:
    determining, by the BS, Precoding Matrix Index (PMI) subset information of the BS, the PMI subset information, determined by the BS, including at least one PMI that is restricted and at least one PMI that is recommend from among a plurality of PMIs;
    transmitting, by the BS, the PMI subset information to a Mobile Station (MS);
    receiving, by the BS, a PMI from the MS; and
    adjusting downlink transmission based on the received PMI,
    wherein each one of the plurality of PMIs respectively indicates a precoding matrix from among a plurality of precoding matrices,
    wherein the at least one PMI that is restricted and the at least on PMI that is recommended are respectively determined based on a probability of being a worst PMI and a probability of being a best PMI, and
    wherein the probability of being the worst PMI and the probability of being the best PMI are determined based on at least one of an antenna configuration of the BS and an antenna spacing.

7. The method of claim 6, wherein the transmitting of the PMI subset information comprises one of unicasting and broadcasting the PMI subset information in a control channel over subbands allocated to the MS.

8. The method of claim 6, wherein the antenna configuration of the BS includes one of a 360 degree coverage antenna configuration, a 60 degree coverage antenna configuration, and a 120 degree coverage antenna configuration.

9. The method of claim 6, wherein the PMI received from the MS is based on the PMI subset information transmitted to the MS.

10. The method of claim 6, wherein the determining of the PMI subset information comprises:
    determining a probability of PMIs in a codebook being a best PMI that minimizes interference to an MS and a worst PMI that maximizes interference to an MS; and
    determining a subset of PMIs included in the codebook based on the determined probability of the PMIs in the codebook being the best PMI and the worst PMI.

11. The method of claim 9, wherein, the determining of the PMI subset information further comprises including restricted PMIs in the subset that have a higher restriction probability and a lower recommendation probability, and recommended PMIs that have a lower restriction probability and a higher recommendation probability.

12. A Mobile Station (MS) apparatus in a wireless communication system, the MS apparatus comprising:
    a receiver for receiving Precoding Matrix Index (PMI) subset information from a Base Station (BS), the PMI subset information received from the BS including at least one PMI that is restricted and at least one PMI that is recommend from among a plurality of PMIs;
    a channel quality measurer for determining downlink channel quality of the BS;
    a PMI calculator for determining a PMI based on the PMI subset information and the determined downlink channel quality of the BS; and
    a transmitter for transmitting the determined PMI to the BS,
    wherein each one of the plurality of PMIs respectively indicates a precoding matrix from among a plurality of precoding matrices,
    wherein the at least one PMI that is restricted and the at least on PMI that is recommended are respectively determined based on a probability of being a worst PMI and a probability of being a best PMI, and wherein the probability of being the worst PMI and the probability of being the best PMI are determined based on at least one of an antenna configuration of the BS and an antenna spacing.

13. The MS apparatus of claim 12, wherein the PMI subset information is received by the receiver in one of unicast and broadcast from the BS in a control channel over subbands allocated to the MS.

14. The MS apparatus of claim 12, wherein the antenna configuration of the BS includes one of a 360 degree coverage antenna configuration, a 60 degree coverage antenna configuration, and a 120 degree coverage antenna configuration.

15. The MS apparatus of claim 12, wherein the PMI subset information is based on a probability of PMIs in a codebook being a best PMI that minimizes interference to an MS and a worst PMI that maximizes interference to an MS.

16. The MS apparatus of claim 15, wherein the PMI subset information comprises a subset of PMIs included in the codebook, and
   further wherein, based on the probability of PMIs in a codebook being the best PMI and the worst PMI, the subset comprises restricted PMIs that have a higher restriction probability and a lower recommendation probability, and recommended PMIs that have a lower restriction probability and a higher recommendation probability.

17. A Base Station (BS) apparatus in a wireless communication system, the BS apparatus comprising:
   a Precoding Matrix Index (PMI) table for storing PMI subset information of the BS, the PMI subset information of the BS including at least one PMI that is restricted and at least one PMI that is recommend from among a plurality of PMIs;
   a transmitter for transmitting the PMI subset information to a Mobile Station (MS);
   a receiver for receiving a PMI from the MS;
   a PMI selector for selecting the received PMI in an interference mitigation precoder; and
   the interference mitigation precoder for adjusting downlink transmission based on the selected PMI,
   wherein each one of the plurality of PMIs respectively indicates a precoding matrix from among a plurality of precoding matrices,
   wherein the at least one PMI that is restricted and the at least on PMI that is recommended are respectively determined based on a probability of being a worst PMI and a probability of being a best PMI, and
   wherein the probability of being the worst PMI and the probability of being the best PMI are determined based on at least one of an antenna configuration of the BS and an antenna spacing.

18. The BS apparatus of claim 17, wherein the transmitter transmits the PMI subset information by one of unicasting and broadcasting the PMI subset information in a control channel over subbands allocated to the MS.

19. The BS apparatus of claim 17, wherein the antenna configuration of the BS includes one of a 360 degree coverage antenna configuration, a 60 degree coverage antenna configuration, and a 120 degree coverage antenna configuration.

20. The BS apparatus of claim 17, wherein the PMI received from the MS is based on the PMI subset information transmitted to the MS.

21. The BS apparatus of claim 17, wherein the PMI subset information is based on a probability of PMIs in a codebook being a best PMI that minimizes interference to an MS and a worst PMI that maximizes interference to an MS.

22. The BS apparatus of claim 21, wherein the PMI subset information comprises a subset of PMIs included in the codebook, and
   further wherein, based on the probability of PMIs in a codebook being the best PMI and the worst PMI, the subset comprises restricted PMIs that have a higher restriction probability and a lower recommendation probability, and recommended PMIs that have a lower restriction probability and a higher recommendation probability.

* * * * *